Feb. 19, 1935.    R. W. CAMPBELL ET AL    1,991,843
PROCESS OF MAKING BENZENE FROM LIGHT OIL
Filed June 16, 1933
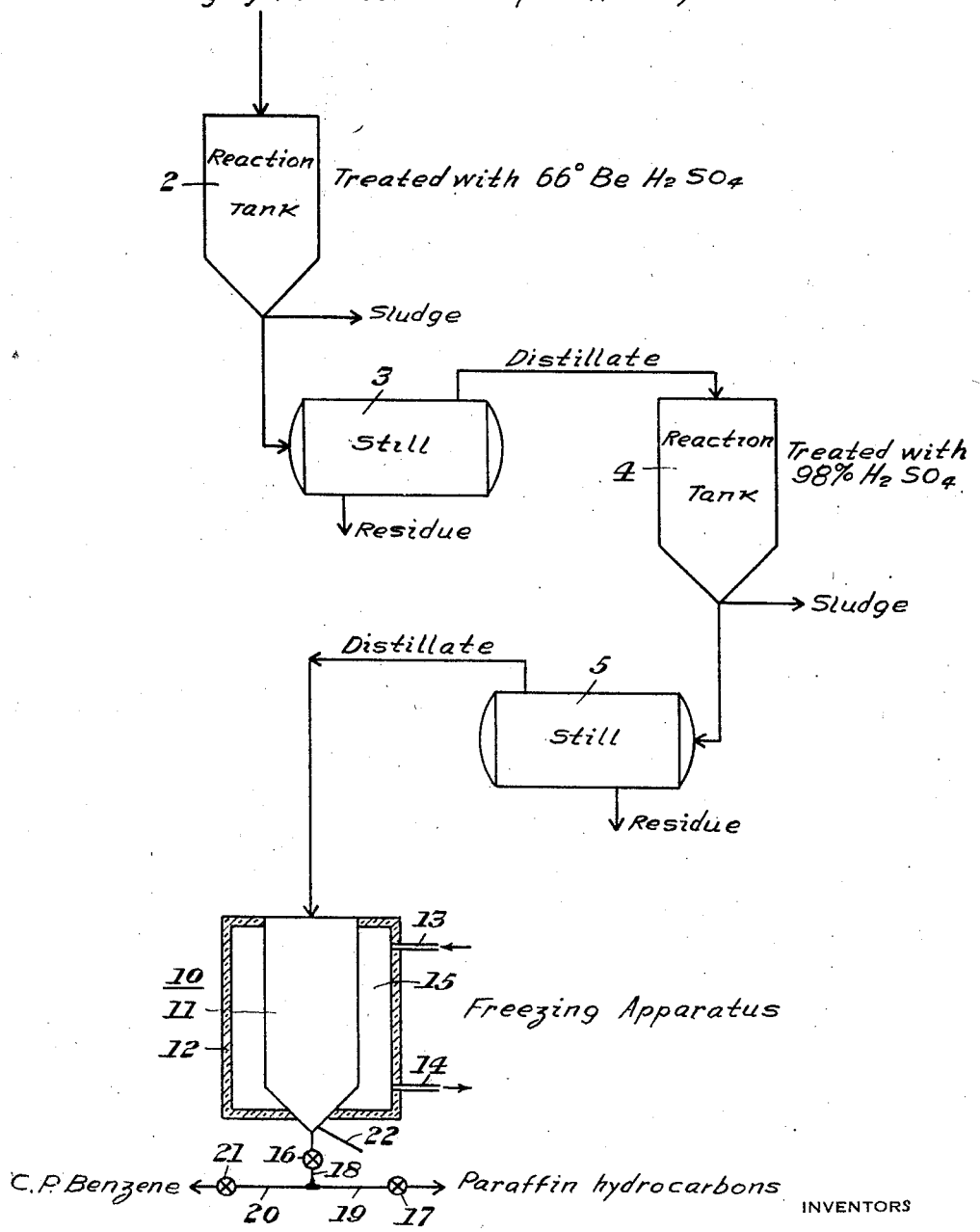
INVENTORS
Robert W. Campbell
Fred W. Wagner
by Byrnes, Stebbins, Parmelee & Blenko Patented Feb. 19, 1935

1,991,843

UNITED STATES PATENT OFFICE 1,991,843

PROCESS OF MAKING BENZENE FROM LIGHT OIL

Robert W. Campbell and Fred W. Wagner, Pittsburgh, Pa., assignors to Jones & Laughlin Steel Corporation, Pittsburgh, Pa., a corporation of Pennsylvania Application June 16, 1933, Serial No. 676,134

8 Claims. (Cl. 260—168)

This invention relates to a process of making benzene from light oil, and more particularly to a process for the treatment of light oil containing relatively large amounts of paraffin hydrocarbons and unsaturated sulphur containing hydrocarbons to produce chemically pure benzene.

The accompanying drawing is a diagrammatic illustration and flow sheet illustrating our process.

According to present day practice, benzene is commercially refined from crude light oil, which is a coal tar distillate, by treating the crude light oil with an excessive amount of 66° Bé. sulphuric acid, neutralizing the product with milk of lime or caustic soda, or both, and then fractionally distilling the neutralized product to separate the benzene from the other components of the crude light oil. Benzene produced in this manner contains sufficient impurities to render it unfit for the chemical industry. These impurities are slight quantities of unsaturated sulphur containing hydrocarbons and paraffin hydrocarbons in the boiling range of benzene. The unsaturated sulphur containing hydrocarbons are usually detected by their action with bromine and the paraffin hydrocarbons are detected by their influence upon the specific gravity and freezing point of the benzene itself.

Our process removes the unsaturated sulphur containing hydrocarbons and paraffin hydrocarbons, as well as the non-sulphur containing unsaturated hydrocarbons, so as to render the benzene suitable for the chemical industry. In general, our process comprises treating the crude light oil containing unsaturated non-sulphur containing hydrocarbons, unsaturated sulphur containing hydrocarbons, and paraffin hydrocarbons with sulphuric acid, preferably 66° Bé. acid, removing the sludge, and neutralizing the product. The neutralized product is then distilled and the residue removed. The distillate is then treated with sulphuric acid of greater strength than that used in the first treatment, preferably 98% sulphuric acid, the sludge is removed and the product neutralized. The neutralized product is then distilled and the residue is removed. The distillate is then subjected to fractional crystallization by freezing, in which the paraffin hydrocarbons remain liquid and are removed from the crystallized benzene. The chemically pure crystallized benzene is then melted and drawn off from the freezing apparatus.

Referring more particularly to the accompanying flow sheet, the crude light oil which is to be treated for the production of chemically pure benzene contains unsaturated non-sulphur containing hydrocarbons, unsaturated sulphur containing hydrocarbons, and paraffin hydrocarbons. This crude light oil is treated in reaction tank 2 with 66° Bé. sulphuric acid, the sludge is removed and the product is neutralized with milk of lime or caustic soda, or both, in the usual manner. The 66° Bé. sulphuric acid reacts with the non-sulphur containing unsaturated hydrocarbons, but does not react to a substantial extent with the sulphur containing unsaturated hydrocarbons. Some of the unsaturated non-sulphur containing hydrocarbons are removed as sludge, but a part remains dissolved or suspended as sludge in the treated light oil. The treated light oil containing the suspended or dissolved non-sulphur containing originally unsaturated hydrocarbons and substantially all of the sulphur containing originally unsaturated hydrocarbons is then passed to still 3 and fractionally distilled. It is preferred to carry out the distillation under vacuum, although ordinary distillation without the use of vacuum may be employed. If vacuum distillation is used, it is preferred to treat the crude light oil in reaction tank 2 with about .4% by volume of 66° Bé. sulphuric acid, whereas if the distillation in still 3 is carried out without the use of vacuum, the crude light oil in reaction tank 2 is preferably treated with about 4 to 5% by volume of the 66° Bé. sulphuric acid. In still 3 the originally unsaturated non-sulphur containing hydrocarbons which were dissolved or suspended in the light oil after the treatment with the 66° Bé. sulphuric acid are removed as residue and the sulphur containing originally unsaturated hydrocarbons pass off as distillate.

The fraction of the distillate from still 3 which has a boiling point range of from 68 to 115° C. preferably from 76 to 110° C., is treated in reaction tank 4 with sulphuric acid of greater strength than was used in treating the light oil in reaction tank 2. It may be between 94 and 100% sulphuric acid, 98% sulphuric acid being preferred. The amount of acid will depend upon the amount of sulphur containing originally unsaturated hydrocarbons present in the crude light oil and upon the strength of the acid employed. We prefer to use about 3.75% by volume of 98% sulphuric acid. This strong acid reacts with the sulphur containing originally unsaturated hydrocarbons, some of these being removed as sludge and others remaining dissolved or suspended in the treated distillate. After the sludge has been removed and the product neutralized, the treated distillate in tank 4 is passed to still 5 where by fractional distillation the sulphur containing originally unsaturated hydrocarbons which were in suspension or solution as sludge in the treated distillate in tank 4, are removed as residue from still 5.

The process thus far described removes from the crude light oil the sulphur containing originally unsaturated hydrocarbons, as well as the non-sulphur containing originally unsaturated hydrocarbons, but the distillate from still 5 contains some paraffin hydrocarbon impurities which should be removed if chemically pure benzene is to be produced.

The paraffin hydrocarbons in the distillate from still 5 are removed in a freezing apparatus indicated by the reference numeral 10. The freezing apparatus comprises an inner vertical container 11, and an outer jacket 12 provided with an inlet pipe 13 and an outlet pipe 14 for cold and hot brine. The distillate from still 5 having a boiling point between 76 and 85° C., preferably between 79.5 and 81.5° C., is admitted into the freezing apparatus and cold brine is circulated in the space 15 between the inner container 11 and jacket 12. The chemically pure benzene is crystallized by freezing, but a core of liquid which contains the paraffin hydrocarbons and other impurities remains unfrozen. This liquid containing the paraffin hydrocarbons is then separated from the benzene crystals by opening valves 16 and 17 which causes the liquid to pass through pipes 18 and 19. After the liquid containing the paraffin hydrocarbons has been withdrawn, the cold brine is withdrawn from the space 15 and hot brine is circulated in its place. This melts the crystallized benzene which is then withdrawn through pipes 18 and 20 after valve 17 has been closed and valve 21 opened. If it is desired to obtain a more complete separation of impurities from the benzene, air may be forced through a pipe 22 which extends into the freezing apparatus in order to agitate the distillate during the freezing operation.

In our process, the crude light oil is treated with sulphuric acid of sufficient strength to react with the non-sulphur containing originally unsaturated hydrocarbons, but not of sufficient strength to react to a substantial extent with the sulphur containing originally unsaturated hydrocarbons. The treated product is then distilled and the distillate is treated with stronger sulphuric acid, for example 98% acid, to remove the sulphur containing originally unsaturated hydrocarbons. If it were attempted to treat the crude light oil originally with 98% sulphuric acid or, in fact, any strength materially stronger than 66° Bé. acid, the heat of reaction would be so great as to sulphonate the benzene itself. However, if the crude light oil is first treated with weaker acid, for example 66° Bé., and the sludge resulting therefrom is removed, the stronger acid, for example 98% sulphuric acid, can then be used without danger of sulphonating the benzene itself. The light oil, after treatment in reaction tank 2 with 66° Bé. sulphuric acid and neutralized, still contains some originally unsaturated non-sulphur containing hydrocarbons in solution or suspension as sludge, as well as sulphur containing originally unsaturated hydrocarbons which have not been reacted upon to any substantial extent by the 66° Bé. acid. The non-sulphur containing originally unsaturated hydrocarbons in suspension or solution as sludge in the treated light oil in reaction tank 2 are removed as residue from still 3. If they were not removed and the 98% sulphuric acid were added to the light oil containing the originally unsaturated non-sulphur containing hydrocarbons in solution or suspension, the acid would react upon the suspended or dissolved matter in preference to the sulphur containing originally unsaturated hydrocarbons and would not remove the latter unless excessive quantities of the acid were used.

We have described in detail the present preferred manner of practicing our invention and have illustrated diagrammatically an arrangement of apparatus suitable for carrying out our process. It is to be understood, however, that the invention may be otherwise embodied or practiced within the scope of the following claims.

We claim:

1. The process of making benzene from light oil, which comprises treating the light oil containing a substantial amount of benzene with sulphuric acid of sufficient strength to react with non-sulphur containing unsaturated hydrocarbons but not to react to a substantial extent with sulphur containing unsaturated hydrocarbons, removing the sludge and neutralizing the product, distilling the treated product, treating the distillate with sulphuric acid of greater strength than 66° Bé. which reacts with sulphur containing hydrocarbons whose presence is identified by reaction with bromine, removing the sludge and neutralizing the treated distillate, and distilling the treated distillate.

2. The process of making benzene from light oil, which comprises treating the light oil containing a substantial amount of benzene with sulphuric acid of not over 66° Bé. strength but of sufficient strength to react with non-sulphur containing unsaturated hydrocarbons, removing the sludge and neutralizing the product, distilling the treated product, treating the distillate with sulphuric acid of over 94% up to 100% strength which reacts with sulphur containing hydrocarbons whose presence is identified by reaction with bromine, removing the sludge and neutralizing the treated distillate, and distilling the treated distillate.

3. The process of making benzene from light oil, which comprises treating the light oil containing a substantial amount of benzene with sulphuric acid of about 66° Bé. strength, removing the sludge and neutralizing the product, distilling the treated product, treating the distillate with sulphuric acid of over 94% up to 100% strength which reacts with sulphur containing hydrocarbons whose presence is identified by reaction with bromine, removing the sludge and neutralizing the treated distillate, and distilling the treated distillate.

4. The process of making benzene from light oil, which comprises treating the light oil containing a substantial amount of benzene with sulphuric acid of about 66° Bé. strength, removing the sludge and neutralizing the product, distilling the treated product, treating the distillate with sulphuric acid of about 98% strength which reacts with sulphur containing hydrocarbons whose presence is identified by reaction with bromine, removing the sludge and neutralizing the treated distillate, and distilling the treated distillate.

5. The process of making benzene from light oil, which comprises treating the light oil containing a substantial amount of benzene with sulphuric acid of sufficient strength to react with non-sulphur containing unsaturated hydrocarbons but not to react to a substantial extent with sulphur containing unsaturated hydrocarbons, removing the sludge and neutralizing the product, distilling the treated product, treating the distillate having a boiling point between 68 and 115° C. with sulphuric acid of greater strength than 66° Bé. which reacts with sulphur containing hydrocarbons whose presence is identified by reaction with bromine, removing the sludge and neutralizing the treated distillate, and distilling the treated distillate.

6. The process of making benzene from light oil, which comprises treating the light oil containing a substantial amount of benzene with sulphuric acid of sufficient strength to react with non-sulphur containing unsaturated hydrocarbons but not to react to a substantial extent with sulphur containing unsaturated hydrocarbons, removing the sludge and neutralizing the product, distilling the treated product, treating the distillate having a boiling point between 76 and 110° C. with sulphuric acid of greater strength than 66° Bé. which reacts with sulphur containing hydrocarbons whose presence is identified by reaction with bromine, removing the sludge and neutralizing the treated distillate, and distilling the treated distillate.

7. The process of making benzene from light oil, which comprises treating the light oil containing a substantial amount of benzene with sulphuric acid of about 66° Bé. strength, removing the sludge and neutralizing the product, distilling the treated product, treating the distillate having a boiling point between 68 and 115° C. with sulphuric acid of over 94% up to 100% strength which reacts with sulphur containing hydrocarbons whose presence is identified by reaction with bromine, removing the sludge and neutralizing the treated distillate, and distilling the treated distillate.

8. The process of making benzene from light oil, which comprises treating the light oil containing a substantial amount of benzene with about .4% by volume of 66° Bé. sulphuric acid, removing the sludge and neutralizing the product, distilling the treated product under vacuum, treating the distillate with sulphuric acid of over 94% up to 100% strength which reacts with sulphur containing hydrocarbons whose presence is identified by reaction with bromine, removing the sludge and neutralizing the treated distillate, and distilling the treated distillate.

ROBERT W. CAMPBELL.
FRED W. WAGNER.